United States Patent [19]
Le Blanc et al.

[11] 3,724,624
[45] Apr. 3, 1973

[54] SEGMENTED FRICTION MEMBER FOR BRAKE OR CLUTCH

[75] Inventors: Walter J. Le Blanc; Friedrich K. W. Rohrlack, both of Troy, Ohio

[73] Assignee: The B. F. Goodrich Company, New York, N.Y.

[22] Filed: June 2, 1971

[21] Appl. No.: 149,189

[52] U.S. Cl. .......................... 192/107 R, 188/218 XL
[51] Int. Cl. ............................................. F16d 69/00
[58] Field of Search .192/107 R, 107 M; 188/218 XL

[56] References Cited

UNITED STATES PATENTS

| | | |
|---|---|---|
| 3,605,968 | 9/1971 | Ely ........................... 192/107 R |
| 3,237,731 | 3/1966 | Du Bois ....................... 192/107 R |
| 3,403,759 | 10/1968 | Holcomb, Jr. ................. 192/107 R |
| 3,478,850 | 6/1968 | Abu-Akeel .................... 192/107 R |

Primary Examiner—Allan D. Herrmann
Assistant Examiner—Randall Heald
Attorney—John D. Haney

[57] ABSTRACT

A brake or clutch mechanism having an annular stator or rotor with a plurality of individual segments connected at one periphery to a torque link ring having tongue and groove hinged connections at the ends of adjacent links for transmitting torque forces without tilting the segments. The connection to the torque link ring and the two connections to adjacent segments at the other periphery provide an improved mounting of each segment.

10 Claims, 4 Drawing Figures

PATENTED APR 3 1973  3,724,624
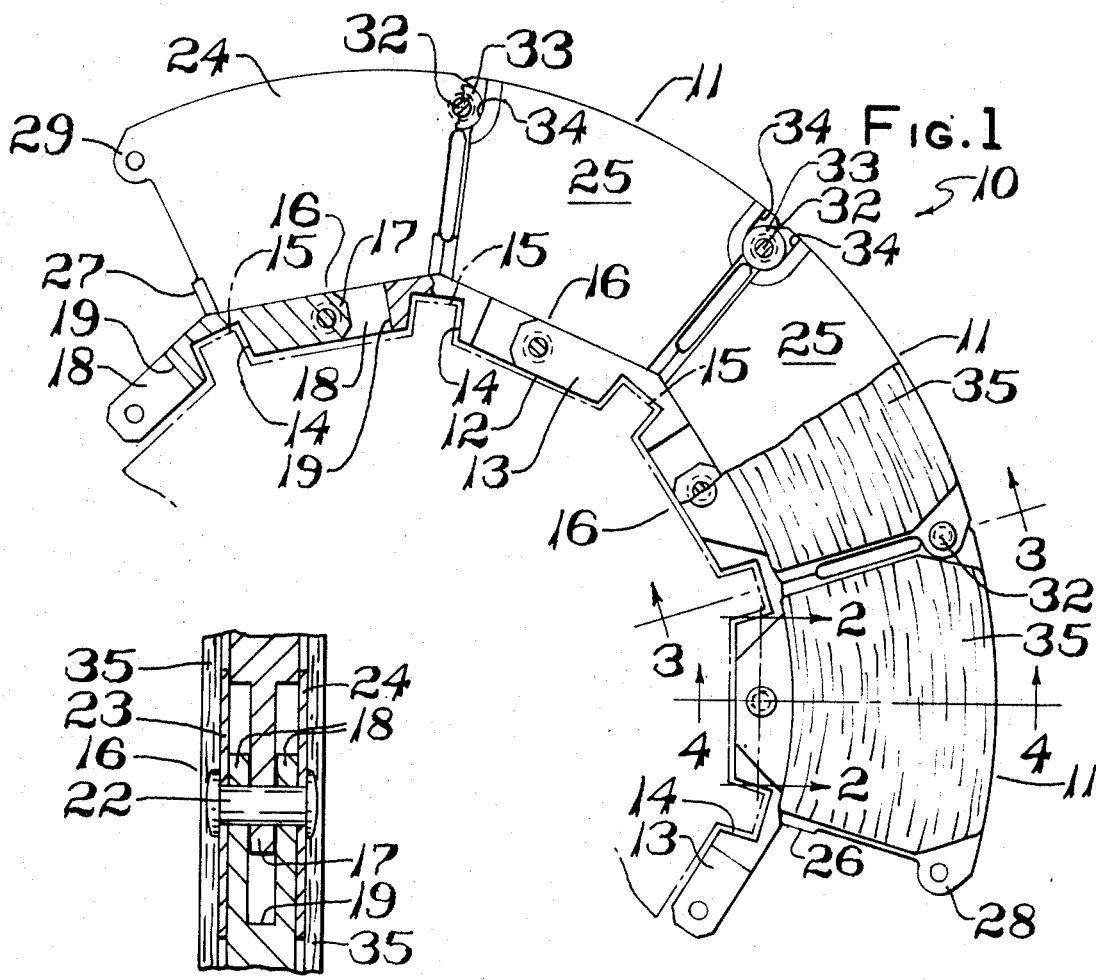
Fig. 1
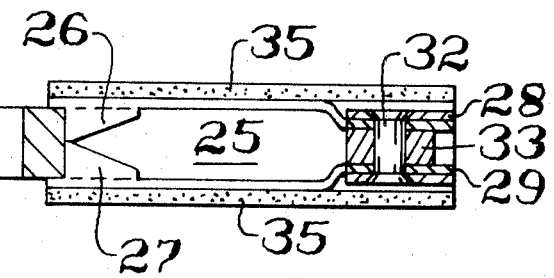
Fig. 2
Fig. 3
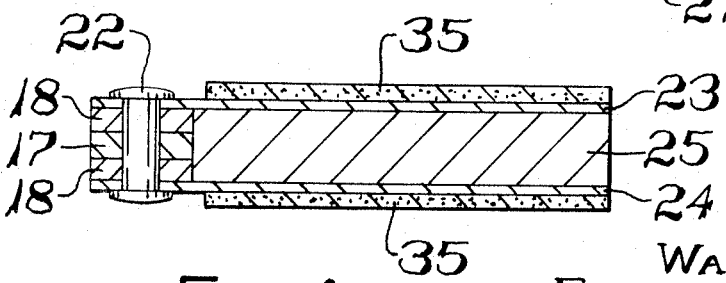
Fig. 4
INVENTOR.S
WALTER J. LeBLANC
FRIEDRICH K. W. ROHRLACK
BY
John D. Haney
ATTY.

SEGMENTED FRICTION MEMBER FOR BRAKE OR CLUTCH

BACKGROUND OF THE INVENTION

This invention relates to disc type brakes or clutches and particularly to the annular friction disc members which engage other friction disc members during operation of a brake or clutch. In high energy brakes such as those used, for example, in aircraft, these friction disc members are referred to as the "heat sink elements" since they must absorb great quantities of heat during the braking operation. Friction linings may be carried by the friction disc members or they may have surfaces which engage friction linings on other disc members.

It has been found that segmented friction disc members reduce the problems caused by thermal warpage and cracking in annular brake discs because the stresses causing the cracking are reduced and the freedom of movement of the segments accommodate thermal warpage. High heat absorbing capacity, which is desirable in high energy aircraft type brakes, has been obtained by positioning plates of heat absorbing material such as beryllium between facing members which support the heat sink material and have the necessary strength to absorb the high torque, wear and shock forces imposed on the friction disc members during operation. Connecting the facing members to the torque members at the inner or outer periphery of the discs has been a problem in that the connections have had to be loose enough to accommodate the thermal expansion while at the same time provide sufficient control to prevent twisting and turning of the segments.

SUMMARY OF THE INVENTION

According to this invention, the segments have facing members which are connected at one periphery to a torque link ring made up of a series of links connected at joints around the ring. These joints provide for equal distribution of the forces transferred from one link to the other and thereby prevent twisting of the segments during operation. The fasteners between the links also provide connections to segments of the disc member. The adjacent segments are directly connected at the opposite periphery of the disc. This results in at least a three-point connection for each segment and thereby provides the necessary stability and constraining forces to counteract the moments tending to rotate the segment.

The accompanying drawings shown one preferred form made in accordance with and embodying this invention and which is representative of how this invention may be practiced.

BRIEF DESCRIPTION OF THE DRAWINGS

In the drawing:

FIG. 1 is a side elevation of a part of an annular disc assembly (shown in solid lines), certain parts being broken away, and illustrated in torque driving engagement with a related part which, in this example, may be a splined torque tube, the sides of which are represented by the chain-dotted line;

FIG. 2 is an enlarged fragmentary sectional view taken along the plane of line 2—2 of FIG. 1;

FIG. 3 is a sectional view taken along the plane of line 3—3 of FIG. 1;

FIG. 4 is a sectional view taken along the plane of line 4—4 of FIG. 1.

DETAILED DESCRIPTION

Referring to FIG. 1, friction disc assembly 10 includes a series of arcuate sector-shaped segments 11 of the same size and shape which are connected to a torque link ring 12. Link members 13 of the torque link ring 12 have axially extending grooves 14 for engagement with mating interfitting splines 15 on an associated torque tube which is represented in chain-dotted lines.

The torque link ring 12 has joints 16 at circumferentially spaced positions around the ring connecting the link members 13. Each joint 16 is of a hinged tongue and groove construction as shown more clearly in FIG. 2, with one end of a link member 13 having a tongue member 17 and a joined bifurcated end of an adjacent link member 13 having outer members 18 forming a circumferentially extending groove 19 in which the tongue member may be inserted. An axially extending rivet 22 provides a connection wherein the forces from one link are equally distributed through the tongue member 17 to the outer members 18 without tilting the link members of the torque link ring 12. Facing members 23 and 24, which may be arcuate sheets of steel or other high-strength material, are clamped to opposite sides of the outer members 18 of the link members 13 by the rivets 22, as shown in FIG. 2. The facing members 23 and 24 extend radially outward on opposite sides of a heat sink body, such as plate 25, which may be of beryllium or other high heat absorbing material. Flanges 26 and 27 at the radially extending edges of facing members 23 and 24 overlie the radially extending edges of the plates 25 at the inner periphery.

At the outer periphery of the facing members 23 and 24, circumferentially extending ears 28 and 29 extend circumferentially from the radially extending edges in overlapping relation for receiving rivets 32 which connect the facing members 23 on one side of the plates 25 and the facing members 24 on the other side of the plates. As shown in FIG. 3, a spacing member 33 may be positioned between the overlapping ears 28 and 29 for maintaining the ears in spaced-apart position and engaging the plates 25 at the radially outer corners which have recesses 34 for accommodating the spacing members.

It will be seen that with this construction the heat sink plates 25 are retained at the inner periphery of the disc by engagement with the link members 13 and at the outer periphery by engagement of the spacing members 33 with the corners of the plates at recesses 34. The flanges 26 and 27 also overlie the radially extending edges of the plates.

As shown in FIG. 1, a friction lining material 35 may be adhered to the facing members 23 and 24 and may be of the type described and set forth in U.S. Pat. No. 2,966,737 of R. E. Spokes et al.

With this construction, the hinged tongue and groove joints 16 of the torque link ring 12 provide for controlled movement between the segments 11 to constrain the tilting movement of the segments which could cause damage to the disc assembly in operation when the friction lining material 35 is forced into engagement with other disc assemblies and alignment is important. The connections of the facing members 23 and 24 at the inner periphery by rivets 22 and at the outer periphery by rivets 32 provide a mounting for each of the segments 11 and with the flanges 26 and 27 limit the rotation of the segments which result from the forces acting on the friction lining material 35 and on the torque link ring 12. The flanges 26 and 27 provide supplemental bearing surfaces engagable by the plates 25 under certain operating conditions and contribute to the durability and longevity of the friction disc assembly 10.

The forces acting on the friction lining material also tend to cause one edge of the segments 11 to lift and the opposing edge of the adjacent segment to be depressed. With the construction of this invention, the rivets 32 connecting the ears 28 and 29 hold the segments in a balanced condition during the application of torque and prevent damage from excessive turning of the segments in a circumferential direction.

We claim:

1. A segmented friction member for a brake or clutch comprising segments assembled to form an annulus, a torque link ring connected to said segments for transmitting torque, said ring having circumferentially spaced link members with joints spaced circumferentially thereof between adjacent joined link members, one of said link members having a bifurcated end with axially spaced-apart circumferentially extending outer members, the other of said link members having a tongue member extending circumferentially between said outer members and a connection from said tongue member to said outer members for transmitting torque forces equally from said tongue member to said outer members whereby said torque forces will maintain said link members and said connected segments in a substantially flat untilted position.

2. A segmented friction member according to claim 1 wherein said torque link ring is positioned at the inner periphery of said annulus for engagement with a torque transmitting body of the brake or clutch and for connection to said segments at the radially inner portions thereof.

3. A segmented friction member according to claim 2 wherein said link members have axially extending grooves between the ends thereof for mounting of said torque link ring on a splined torque tube of a brake or clutch.

4. A segmented friction member according to claim 2 wherein said connection from said tongue member to said outer members connects said torque link ring to one of said segments at the radially inner periphery.

5. A segmented friction member according to claim 4 wherein each of said segments is connected to an adjacent segment at an opposing edge thereof providing a three-point mounting of each segment in said segmented friction member for counteracting the moment tending to rotate the segments during operation when torque is applied.

6. A segmented friction member according to claim 5 wherein each of said segments has a heat sink body of heat absorbing material and a facing member for frictional engagement with other brake or clutch members, said facing member supporting said heat sink body and being connected to said torque link ring by said connection from said tongue member to said outer members and being connected to a facing member of an adjacent segment at a radially outer corner.

7. A segmented friction member according to claim 1 wherein each of said segments is connected to said torque link ring at one periphery of said annulus by said connection from said tongue member to said outer members and adjacent segments are connected along an opposing edge thereof providing a three-point mounting of each segment in said segmented friction member for counteracting the moment tending to rotate the segments when torque forces are applied.

8. A segmented friction member according to claim 7 wherein each of said segments has a heat sink body of heat absorbing material and a facing member for frictional engagement with other brake or clutch members, said facing member supporting said heat sink body and being connected to said torque link ring by said connection from said tongue member to said outer members and being connected to a facing member of an adjacent segment at a position in the proximity of the opposite periphery of said annulus.

9. A segmented friction member according to claim 8 wherein said heat sink body has an edge engagable with a link member of said torque link ring providing a bearing surface for each said segment.

10. A segmented friction member according to claim 9 wherein said facing member has flanges at the radially extending edges overlying the edges of said heat sink body providing additional bearing surfaces for each said segment.

* * * * *